US012700802B2

(12) United States Patent
Mine et al.

(10) Patent No.: US 12,700,802 B2
(45) Date of Patent: Aug. 4, 2026

(54) POWER CONVERSION DEVICE AND CONTROL METHOD THEREFOR

(71) Applicant: Panasonic Intellectual Property Management Co., Ltd., Osaka (JP)

(72) Inventors: Koki Mine, Osaka (JP); Koji Yoshida, Nara (JP); Takeshi Nakayashiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 18/702,022

(22) PCT Filed: Oct. 4, 2022

(86) PCT No.: PCT/JP2022/037053
§ 371 (c)(1),
(2) Date: Apr. 17, 2024

(87) PCT Pub. No.: WO2023/068030
PCT Pub. Date: Apr. 27, 2023

(65) Prior Publication Data
US 2025/0088107 A1 Mar. 13, 2025

(30) Foreign Application Priority Data
Oct. 21, 2021 (JP) ................................. 2021-172057

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0022* (2021.05); *H02M 1/36* (2013.01);
(Continued)

(58) Field of Classification Search
CPC ...... H02M 3/158; H02M 1/0022; H02M 1/36; H02M 3/1584; H02M 3/157; B60R 16/033
See application file for complete search history.

(56) References Cited

U.S. PATENT DOCUMENTS

2017/0373597 A1 12/2017 Kato et al.
2018/0175738 A1 6/2018 Kikuchi

FOREIGN PATENT DOCUMENTS

CN 111600476 8/2020
JP 2006-042576 2/2006
(Continued)

OTHER PUBLICATIONS

International Search Report issued in International Pat. Appl. No. PCT/JP2022/037053, dated Nov. 22, 2022, along with an English translation thereof.
Extended European Search Report dated Jan. 8, 2025 issued in European patent application No. 22883336.4.

*Primary Examiner* — Crystal L Hammond
*Assistant Examiner* — Jonathan Walter Soileau
(74) *Attorney, Agent, or Firm* — Greenblum & Bernstein, P.L.C.

(57) ABSTRACT

A power conversion device includes: a DC/DC converter including a conversion circuit; and a control circuit that detects a first voltage at an output terminal, a first current flowing through the conversion circuit, and a second voltage at an input terminal, obtains information indicating a target output voltage and a predetermined voltage, and performs calculations to emit a PWM signal for operating the conversion circuit. The control circuit performs: a first calculation for calculating a target current for approximating the first voltage to the target output voltage; a second calculation for calculating a first duty ratio for approximating the first current to the target current; a third calculation for calculating a second duty ratio based on the predetermined
(Continued)

voltage and the second voltage; and a fourth calculation for calculating a driving duty ratio of the PWM signal using the first and the second duty ratios to control the first voltage.

11 Claims, 8 Drawing Sheets

(51) Int. Cl.
    *H02M 1/36*       (2007.01)
    *B60R 16/033*    (2006.01)
    *H02M 3/157*    (2006.01)
(52) U.S. Cl.
    CPC ......... *H02M 3/1584* (2013.01); *B60R 16/033*
               (2013.01); *H02M 3/157* (2013.01)

(56)              References Cited

FOREIGN PATENT DOCUMENTS

| JP | 2007-068290 | | 3/2007 | |
| JP | 2007068290 | A * | 3/2007 | |
| JP | 2008-109736 | | 5/2008 | |
| JP | 2009-177865 | | 8/2009 | |
| JP | 2021-223729 | A | 11/2011 | |
| JP | 2011223729 | A * | 11/2011 | |
| JP | 2014-057521 | | 3/2014 | |
| JP | 2018-007291 | | 1/2018 | |
| JP | 2018007291 | A * | 1/2018 | ............. H02M 1/15 |
| JP | 2018-102113 | | 6/2018 | |
| JP | 2018092861 | A * | 6/2018 | |

\* cited by examiner

Figure 4:
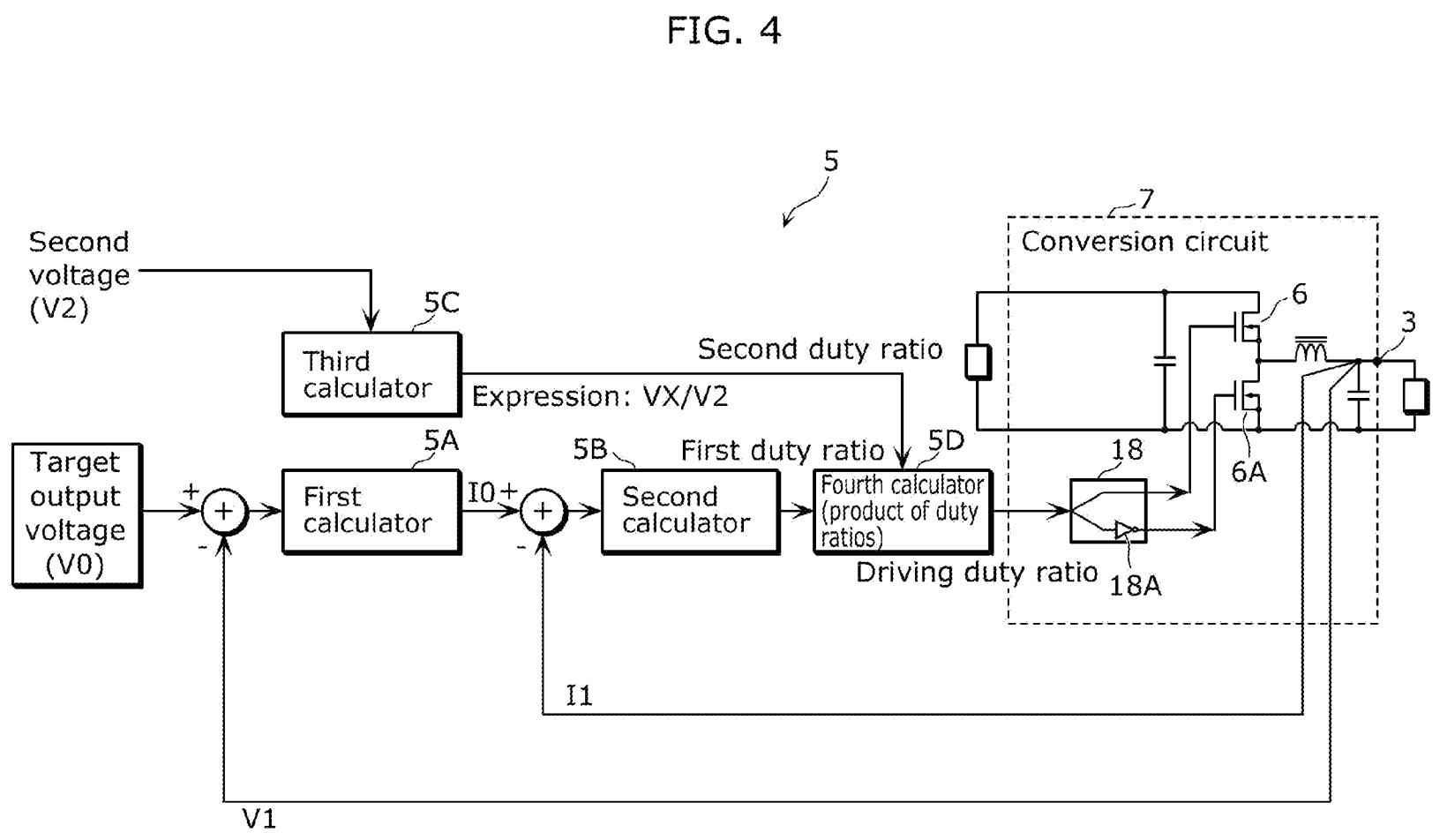

Conversion circuit

Second duty ratio

Expression: VX/V2

First duty ratio

Driving duty ratio

Second voltage (V2)

Third calculator

Second calculator

Fourth calculator (product of duty ratios)

Target output voltage (V0)

First calculator $I0+$ $I1$ $V1$

FIG. 5

POWER CONVERSION DEVICE AND CONTROL METHOD THEREFOR

TECHNICAL FIELD

The present disclosure relates to a power conversion device for use in various types of electric devices and a control method therefor, and in particular, relates to a power conversion device and so on including a DC/DC converter.

BACKGROUND ART

The following describes a conventional power conversion device. A conventional power conversion device stabilizes an output voltage by using a first controller that calculates a target current value for a current to be applied to the power conversion device to make an output voltage equal to an instructed output voltage; and a current controller that feeds back a current value of a converter with respect to the target current value and outputs a signal for driving the power conversion device to cause the current to follow the target current value.

Note that, for example, Patent Literature (PTL) 1 has been known as literature related to disclosure of the present application.

CITATION LIST

Patent Literature

[PTL 1] Japanese Unexamined Patent Application Publication No. 2008-109736

SUMMARY OF INVENTION

Technical Problem

However, in the conventional power conversion device, the first controller and the current controller operate based on the output voltage. Therefore, when an input voltage rapidly changes, the output voltage may be unstable and the output voltage may change greatly.

In view of the above, an object of the present disclosure is to provide a power conversion device and so on that can stabilize the output voltage even when the input voltage changes greatly.

Solution to Problem

In order to achieve the object, a power conversion device according to one aspect of the present disclosure includes: an input terminal; an output terminal; a DC/DC converter that is connected to the input terminal and the output terminal and includes a switching element and a conversion circuit that convers direct-current power; and a control circuit that detects a first voltage at the output terminal, a first current flowing through the conversion circuit, and a second voltage at the input terminal, obtains information indicating a target output voltage and a predetermined voltage, and performs a plurality of calculations to emit a pulse width modulation (PWM) signal for driving the switching element. The control circuit: performs a first calculation for calculating a target current for approximating the first voltage to the target output voltage; performs a second calculation for calculating a first duty ratio for approximating the first current to the target current; performs a third calculation for calculating a second duty ratio based on the predetermined voltage and the second voltage; performs a fourth calculation for calculating a driving duty ratio of the PWM signal using the first duty ratio and the second duty ratio; and controls the first voltage by emitting the PWM signal having the driving duty ratio.

Moreover, a control method for a power conversion device according to one aspect of the present disclosure is a control method for a power conversion device. The power conversion device includes: an input terminal; an output terminal; a DC/DC converter that is connected to the input terminal and the output terminal and includes a switching element and a conversion circuit that converts direct-current power; and a control circuit that detects a first voltage at the output terminal, a first current flowing through the conversion circuit, and a second voltage at the input terminal, obtains information indicating a target output voltage and a predetermined voltage, and performs a plurality of calculations to emit a pulse width modulation (PWM) signal for driving the switching element. The control method includes: performing, by the control circuit, a first calculation for calculating a target current for approximating the first voltage to the target output voltage; performing, by the control circuit, a second calculation for calculating a first duty ratio for approximating the first current to the target current; performing, by the control circuit, a third calculation for calculating a second duty ratio based on the predetermined voltage and the second voltage; performing, by the control circuit, a fourth calculation for calculating a driving duty ratio of the PWM signal using the first duty ratio and the second duty ratio; and controlling, by the control circuit, the first voltage by emitting the PWM signal having the driving duty ratio.

Advantageous Effects of Invention

The power conversion device and so on according to the present disclosure perform a feedback control by using a value of the output voltage with respect to the value of the target output voltage, and a feedforward control by using the value of the input voltage with respect to the voltage of the predetermined voltage. With this, even when the value of the input voltage changes rapidly, the feedforward control can approximate the output voltage to the predetermined voltage in a short time. As a result, the output voltage can be maintained at a stable value.

BRIEF DESCRIPTION OF DRAWINGS

FIG. 3 is a first calculation block diagram illustrating a configuration of the power conversion device according to the embodiment.

FIG. 4 is a second calculation block diagram illustrating a configuration of the power conversion device according to the embodiment.

FIG. 5 is a third circuit block diagram illustrating a configuration of the power conversion device according to the embodiment.

DESCRIPTION OF EMBODIMENTS

The following describes an embodiment of the present disclosure with reference to the drawings.

Embodiment

Figure 1:
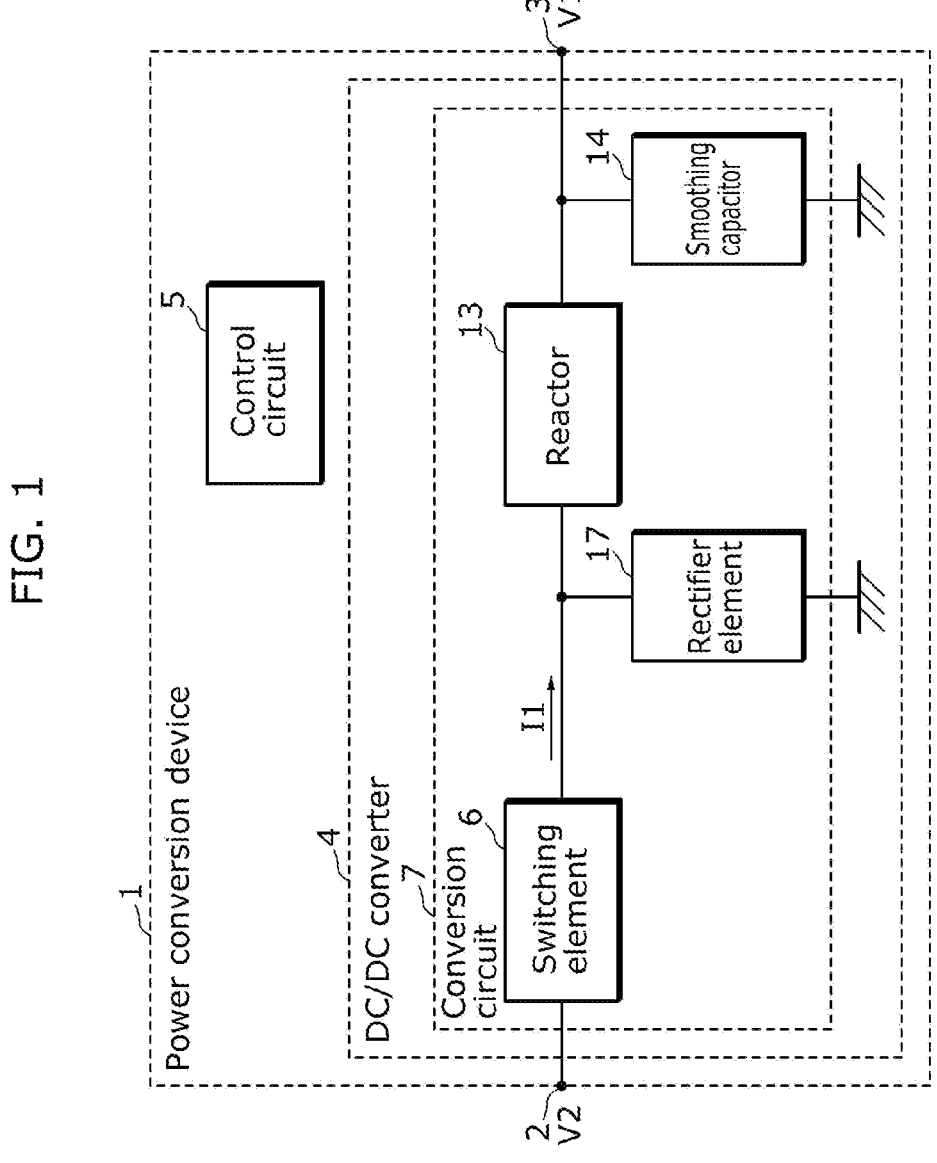
FIG. 1 is a first circuit block diagram illustrating a configuration of a power conversion device according to an embodiment.

FIG. 1 is a first circuit block diagram illustrating a configuration of power conversion device 1 according to the embodiment.

Power conversion device 1 includes input terminal 2, output terminal 3, DC/DC converter 4, and control circuit 5. DC/DC converter 4 includes conversion circuit 7 that includes switching element 6.

DC/DC converter 4 is connected to input terminal 2 and output terminal 3. Moreover, DC/DC converter 4 includes conversion circuit 7. Conversion circuit 7 is connected to input terminal 2 and output terminal 3. Conversion circuit 7 includes switching element 6, and converts direct current power to step-up or step-down the direct current voltage input from input terminal 2 to supply the direct current from output terminal 3 to outside, by switching element 6 repeating a connection state and a disconnected state at a predetermined duty ratio. Note that conversion circuit 7 includes reactor 13, smoothing capacitor 14, and rectifier element 17, and these structural elements will be described in detail with reference to FIG. 2.

Control circuit 5 detects first voltage V1 at output terminal 3, first current I1 flowing through conversion circuit 7, and second voltage V2 at input terminal 2. Moreover, control circuit 5 emits a PWM signal for controlling and driving switching element 6. Moreover, control circuit 5 obtains target output voltage V0 and information of a predetermined voltage (target output voltage V0 in the present embodiment), which serves as a reference for the input voltage in feedforward control, and performs calculations, which will be described below. Note that, as hardware, control circuit 5 includes, for example, an A/D converter that obtains (i) a voltage from a current sensor that detects a current and (ii) a voltage at a predetermined location; a driving circuit that emits a PWM signal; a program that performs calculations; memory that holds, for example, information indicating target output voltage V0 and the predetermined voltage; and a processor that executes a program.

Control circuit 5 performs, as the above-mentioned calculations, a first calculation, a second calculation, a third calculation, and a fourth calculation to output first voltage V1 at output terminal 3 at target output voltage V0.

In the first calculation, target current I0 for approximating first voltage V1 to target output voltage V0 is calculated based on first voltage V1 and target output voltage V0. In the second calculation, a first duty ratio for approximating first current I1 to target current I0 is calculated. In the third calculation, a second duty ratio is calculated based on second voltage V2 and the predetermined voltage (target output voltage V0 in the present embodiment). In the fourth calculation, a driving duty ratio of a PWM signal is calculated using the first duty ratio and the second duty ratio.

With the above configuration and functional operations, (i) feedback control by performing the first calculation and the second calculation to control the current value using the output voltage at present with respect to the value of the target output voltage, and (ii) feedforward control by performing the third calculation using a value of the input voltage at present with respect to the value of the predetermined voltage (the target output voltage in the present embodiment) are performed. Stated differently, the output voltage is controlled by using both (i) a PWM signal having the first duty ratio that is based on the feedback control using the value of the output voltage at present with respect to the value of the target output voltage and (ii) a PWM signal having the second duty ratio that is based on the feedforward control using the value of the input voltage at present with respect to the value of the target output voltage.

With this, even when the value of the input voltage changes rapidly, the feedforward control can approximate the value of the output voltage to the target output voltage in a short time without repeating the feedback control as in the conventional technique. As a result, the output voltage can be maintained at a stable value.

Figure 2:
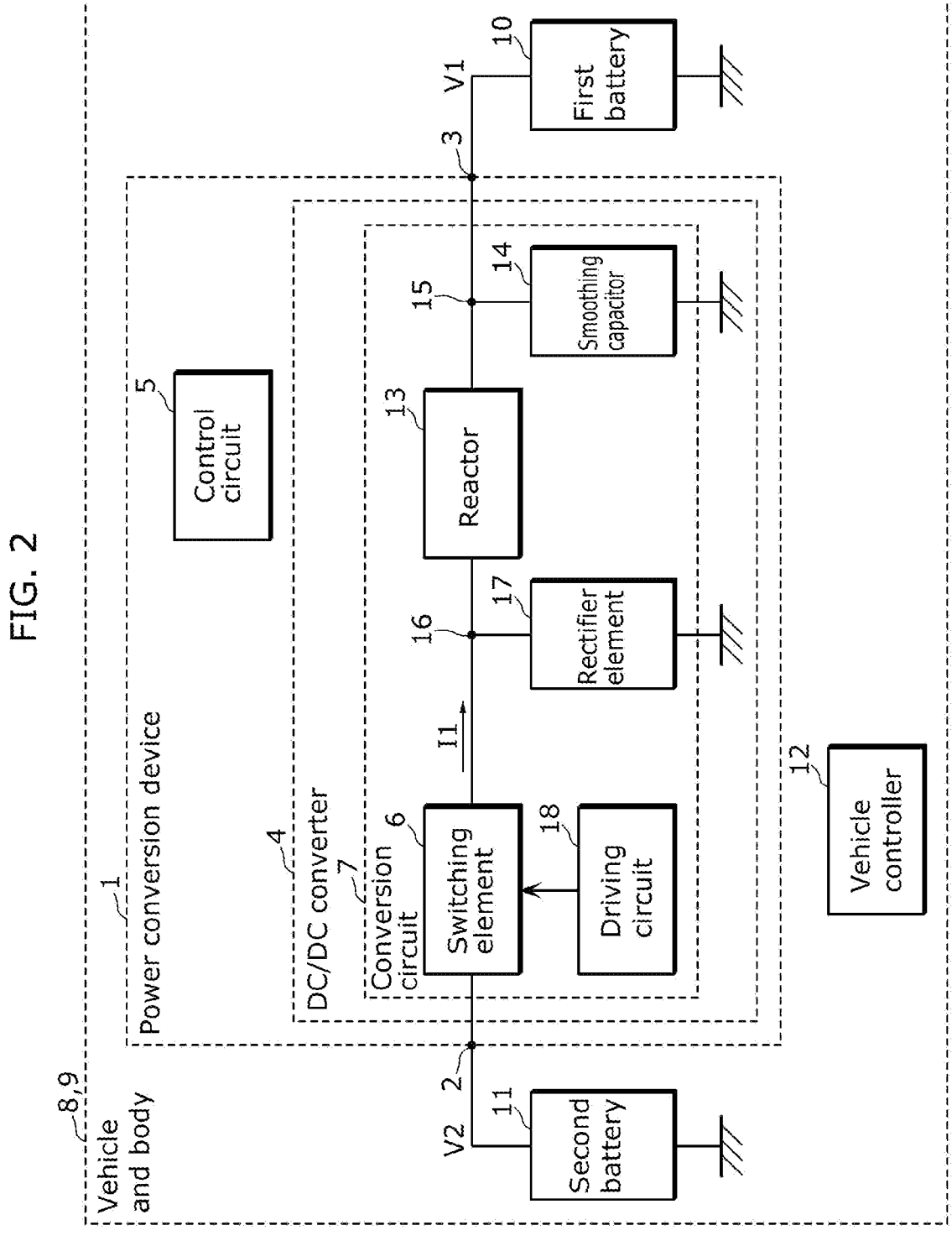
FIG. 2 is a second circuit block diagram illustrating a configuration of the power conversion device according to the embodiment.

In the following, details of operations of power conversion device 1 will be described with reference to the second circuit block diagram in FIG. 2 illustrating a configuration of the power conversion device according to the embodiment. Here, power conversion device 1 provided in body 9 of vehicle 8 is connected to first battery 10 and second battery 11. Power conversion device 1 charges first battery 10 to target output voltage V0 by using the power of second battery 11. The voltage of first battery 10 is lower than the voltage of second battery 11.

When an occupant of vehicle 8 gives an instruction to start vehicle 8, for example, turns on the ignition switch, vehicle controller 12 provided in body 9 emits start signal S1 to control circuit 5. Upon receipt of start signal S1 at timing T0, control circuit 5 detects, at timing T0, first voltage V1 at output terminal 3, second voltage V2 at input terminal 2, and first current I1 flowing through conversion circuit 7. Stated differently, control circuit 5 detects the voltage of first battery 10 connected to output terminal 3, and the voltage of second battery 11 connected to input terminal 2.

First current I1 may be detected by emitting, to control circuit 5, a signal that corresponds to the current flowing through switching element 6 and reactor 13 connected in series, by a current sensor (not illustrated) such as a shunt resistor and a voltage amplification circuit. Here, as an example of the configuration for step-down operation, conversion circuit 7 includes (i) smoothing capacitor 14 connected between a ground and connection point 15, which is a connection point between reactor 13 and output terminal 3, and (ii) rectifier element 17 connected between a ground and connection point 16, which is a connection point between switching element 6 and reactor 13. The current sensor (not illustrated) emits a signal that corresponds to the current between connection point 16 and output terminal 3 to control circuit 5. The above-described detection of the current and the voltage may be performed by a detection circuit (not illustrated) such as A/D converter included in control circuit 5. Here, rectifier element 17 may be replaced with a switching element (not illustrated). The switching element (not illustrated) used instead of rectifier element 17 may perform the inverse opening and closing operation of switching element 6.

Moreover, control circuit 5 emits a PWM signal for controlling and driving switching element 6. A PWM signal may be emitted by driving circuit 18 included in control circuit 5. Note that, at timing T0, control circuit 5 does not need to emit control signal S2 that is a PWM signal for turning switching element 6 on and off. In such a case, control circuit 5 may emit control signal S2, which is a PWM signal having an initial duty ratio that is set in advance as a predetermined duty ratio.

Control circuit 5 obtains information of target output voltage V0. Target output voltage V0 may be a value stored in advance in a storage circuit (not illustrated) such as memory included in control circuit 5. Alternatively, a value of target output voltage V0 may be transmitted from vehicle controller 12 to control circuit 5 when vehicle 8 is started.

Figure 3:
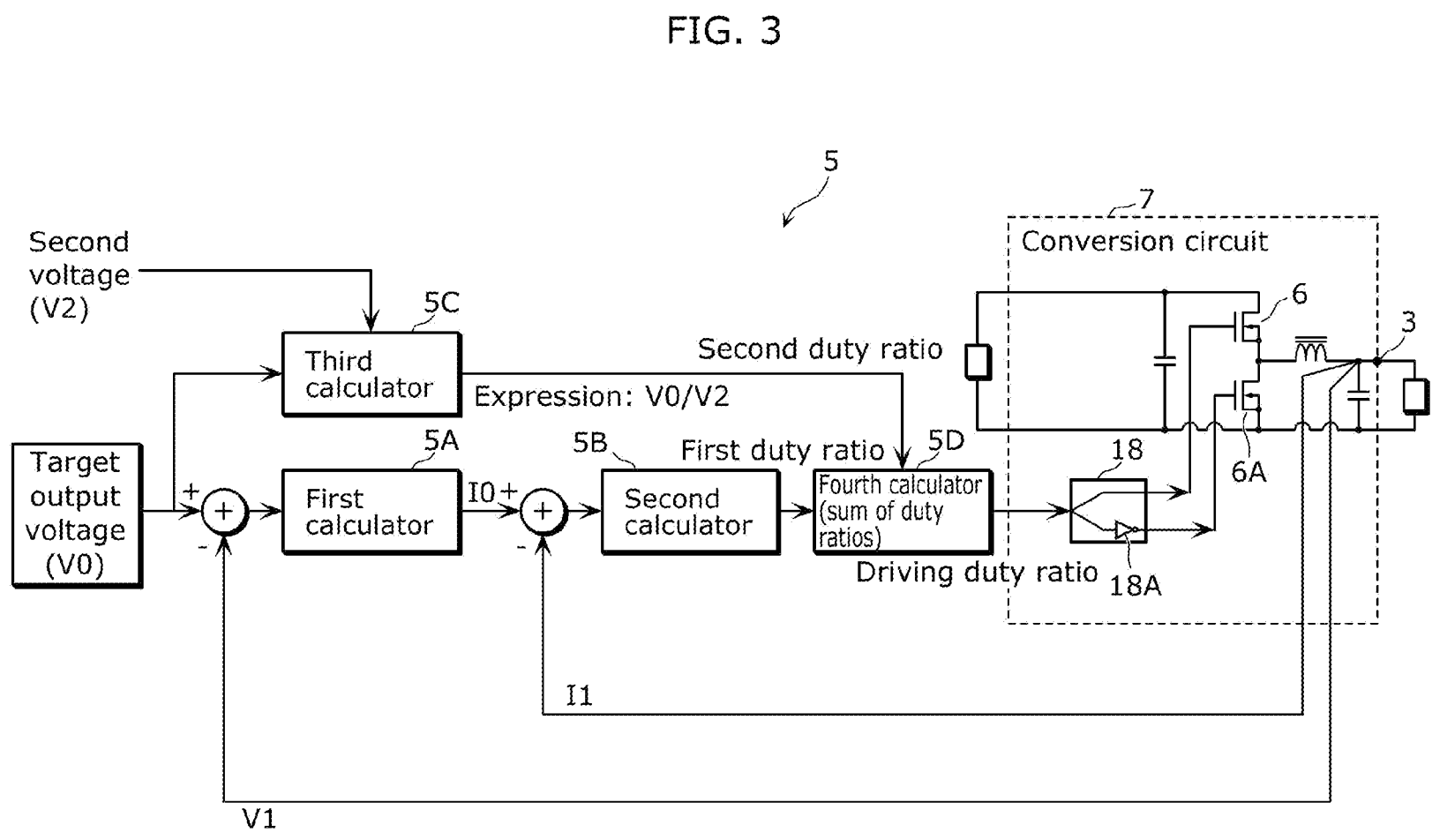

Here, a calculation procedure of control circuit 5 (i.e., a control method for the power conversion device) will be described with reference to the first calculation block diagram in FIG. 3 illustrating a configuration of the power conversion device according to the embodiment. As illustrated in FIG. 3, control circuit 5 includes, as a functional configuration, first calculator 5A that performs the first calculation, second calculator 5B that performs the second calculation, third calculator 5C that performs the third calculation, and fourth calculator 5D that performs the fourth calculation. Each calculation is performed by digital calculation in the present embodiment.

First, at timing T0, first calculator 5A of control circuit 5 compares first voltage V1 detected at output terminal 3 with target output voltage V0. Furthermore, first calculator 5A sets, by first calculation, target current I0, which is a current value to be supplied by conversion circuit 7, to approximate or match first voltage V1 to target output voltage V0, based on a difference between first voltage V1 and target output voltage V0. For example, first calculator 5A calculates target current I0 by performing calculation according to a function for approximating (i) a difference between first voltage V1 and target output voltage V0 and (ii) an integral of the difference in a latest predetermined period to zero.

Note that timing T0 is a timing to start an operation for controlling first voltage V1 to make first voltage V1 an appropriate value. The operation for controlling first voltage V1 to make first voltage V1 an appropriate value is repeatedly performed by control circuit 5 in a predetermined cycle.

After the first calculation is performed by first calculator 5A, the second calculation is performed by second calculator 5B of control circuit 5. In the second calculation, a first duty ratio for approximating or match first current I1 detected by conversion circuit 7 to target current I0 is calculated using target current I0 set by the first calculation. For example, second calculator 5B calculates a first duty ratio by performing calculation according to a function for approximating (i) a difference between first current I1 and target current I0 and (ii) an integral of the difference in a latest predetermined period to zero.

Note that first current I1 to be used to calculate the first duty ratio may be a value detected at timing T0 or a value detected at timing T1 at which the second calculation is performed. The second calculation is performed after the first calculation. First current I1 may be detected at any part of conversion circuit 7. Stated differently, the part where first current I1 is detected does not matter.

In parallel with the first calculation by first calculator 5A or with the second calculation by second calculator 5B, the third calculation is performed by third calculator 5C of control circuit 5. In the third calculation, a second duty ratio is calculated based on a ratio between target output voltage V0 detected at timing T0 and second voltage V2 at input terminal 2. Here, the second duty ratio may be a value obtained by dividing target output voltage V0 by second voltage V2. For example, third calculator 5C calculates, as the second duty ratio, a value obtained by dividing target output voltage V0 by second voltage V2 (V0/V2).

After the first calculation, the second calculation, and the third calculation are performed, the fourth calculation is performed by fourth calculator 5D of control circuit 5. In the fourth calculation, a driving duty ratio of a PWM signal is calculated by using the first duty ratio calculated by the second calculation and the second duty ratio calculated by the third calculation. The PWM signal having the driving duty ratio is emitted from control circuit 5 as control signal S2 and used to control or drive switching element 6.

In the present embodiment, a second duty ratio is calculated in the third calculation, based on a ratio between target output voltage V0 and second voltage V2 at input terminal 2. With this, first voltage V1 can be output as a value that quickly follows a change in second voltage V2.

Here, a driving duty ratio calculated in the fourth calculation may be calculated using a sum of the first duty ratio and the second duty ratio. As described above, the first duty ratio is determined by feedback control to adjust target current I0 to be output by conversion circuit 7 according to first voltage V1 that corresponds to the output voltage. Moreover, as described above, the second duty ratio is determined by feedforward control to adjust first voltage V1 according to second voltage V2 that corresponds to the input voltage.

Stated differently, the second duty ratio to be used for the feedforward control may contain many error components, and therefore the first duty ratio to be used for feedback control is applied to correction calculation. A driving duty ratio is obtained by adding the first duty ratio and the second duty ratio. As a result, the driving duty ratio can be obtained by an easy calculation, and thus the control is highly versatile and can be performed easily. Even when the value of the input voltage changes rapidly, the value of the output voltage can be approximated to the target output voltage in a short time by using feedforward control in addition to feedback control, without repeating the feedback control as in the conventional technique. As a result, the output voltage can be maintained at a stable value.

Moreover, as illustrated in the second calculation block diagram in FIG. 4 illustrating a configuration of the power conversion device according to the embodiment, in the third calculation, constant output voltage VX, which is set in advance, may be given to control circuit 5 as a predetermined voltage serving as a reference to the input voltage in the feedforward control, and a second duty ratio may be calculated based on a ratio between output constant voltage VX and second voltage V2.

With this, the second duty ratio obtained by third calculator 5C depends on constant output voltage VX, not on a value of second voltage V2 at input terminal 2. As a result, first voltage V1 can be output as a stable value.

Here, a driving duty ratio may be calculated using a product of the first duty ratio and the second duty ratio. As described above, the first duty ratio is determined by feedback control to adjust target current I0 to be output by conversion circuit 7 according to first voltage V1 that corresponds to the output voltage. Moreover, as described above, the second duty ratio is determined by feedforward control to adjust first voltage V1 according to second voltage V2 that corresponds to the input voltage.

Stated differently, the second duty ratio to be used for the feedforward control may contain many error components, and therefore the first duty ratio to be used for feedback control is applied to correction calculation. With this, a driving duty ratio is obtained as a value that is corrected by multiplying the first duty ratio by the second duty ratio. Here, to be more specific, the first duty ratio may be determined by causing DC/DC converter 4 to perform step-down operation in a state where second voltage V2 that corresponds to the input voltage is higher than first voltage V1 that corresponds to the output voltage and by setting the gain of the feedback control to a value inversely proportional to second voltage V2.

With this, when DC/DC converter 4 performs step-down operation, a change in first voltage V1 can be suppressed regardless of a change in second voltage V2, and a gain in the driving duty ratio can be easily adjusted. As a result, the driving duty ratio can be obtained by an easy calculation, and thus the control is highly versatile and can be performed easily. Even when the value of the input voltage changes rapidly, the value of the output voltage can be approximated to the target output voltage in a short time by using feedforward control in addition to the feedback control, without repeating the feedback control as in the conventional technique. As a result, the output voltage can be maintained at a stable value.

With the above configuration and functional operations, (i) feedback control by performing the first calculation and the second calculation to control the current value using the output voltage at present with respect to the value of the target output voltage, and (ii) feedforward control by performing the third calculation using a value of the input voltage at present with respect to the value of the target output voltage. Stated differently, the output voltage is controlled by using both (i) a PWM signal having the first duty ratio that is based on the feedback control using the value of the output voltage at present with respect to the value of the target output voltage and (ii) a PWM signal having the second duty ratio that is based on the feedforward control using the value of the input voltage at present with respect to the value of the target output voltage.

With this, even when the value of the input voltage changes rapidly, the feedforward control can approximate the value of the output voltage to the target output voltage in a short time without repeating the feedback control. As a result, the output voltage can be maintained at a stable value.

As described above, as illustrated in FIG. 3, driving circuit 18 emits a control signal to turn switching element 6 on and off and turn switching element 6A on and off according to a driving duty ratio emitted by fourth calculator 5D. The control signal for switching element 6A is an inverted signal of the control signal for switching element 6, and thus the control signal for switching element 6A may be obtained by inverting the control signal for switching element 6 by inverter 18A. Stated differently, a PWM signal having a driving duty ratio emitted from fourth calculator 5D may be applied to the control signal for switching element 6. A PWM signal having a driving duty ratio emitted from fourth calculator 5D may be inverted and applied to the control signal for switching element 6A.

Figure 5:
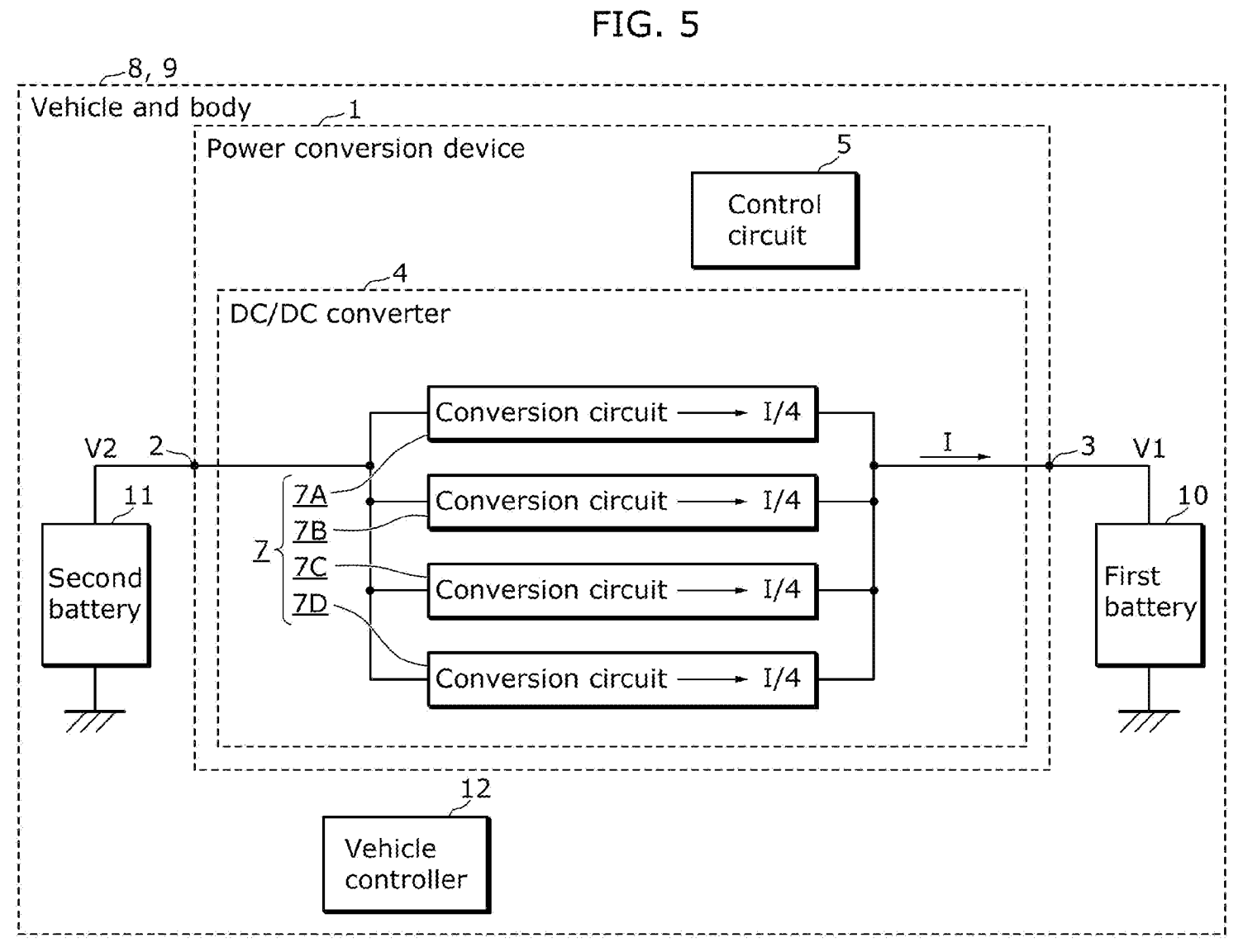

Here, as illustrated in the third circuit block diagram in FIG. 5 illustrating a configuration of the power conversion device according to the embodiment, DC/DC converter 4 may include conversion circuits 7A, 7B, 7C, and 7D that are connected in parallel. In other words, the input terminals of the respective conversion circuits 7A, 7B, 7C, and 7D are connected to each other, and the output terminals of the respective conversion circuits 7A, 7B, 7C, and 7D are connected to each other. In the figure, conversion circuit 7 including four phases of conversion circuits 7A, 7B, 7C, and 7D is used as an example, but conversion circuit 7 including N phases of conversion circuits may be used, where N is an integer.

Here, control circuit 5 calculates a driving duty ratio for each of conversion circuits 7A, 7B, 7C, and 7D, each of which is conversion circuit 7. Here, in the first calculation, the above-described operation is performed in the same manner.

In the second calculation, a first duty ratio for each phase is calculated by using a value of I0/4, which is obtained by dividing target current I0 set by the first calculation for conversion circuits 7A, 7B, 7C, and 7D, each of which is conversion circuit 7, by the number of phases to approximate or match each of first currents I1A, I1B, I1C, and I1D to I0/4. In the third calculation, the above-described operation is performed in the same manner and a second duty ratio is calculated. Also, in the fourth calculation, a driving duty ratio of a PWM signal for each phase is calculated using the first duty ratio calculated by the second calculation and the second duty ratio calculated by the third calculation.

With the above-described configuration and operations, individual conversion circuits 7A, 7B, 7C, and 7D are controlled separately; first current I1, which corresponds to a total sum of first current I1A, I1B, I1C, and I1D, is stabilized; and power conversion device 1 can output first voltage V1 stably.

Figure 6A:
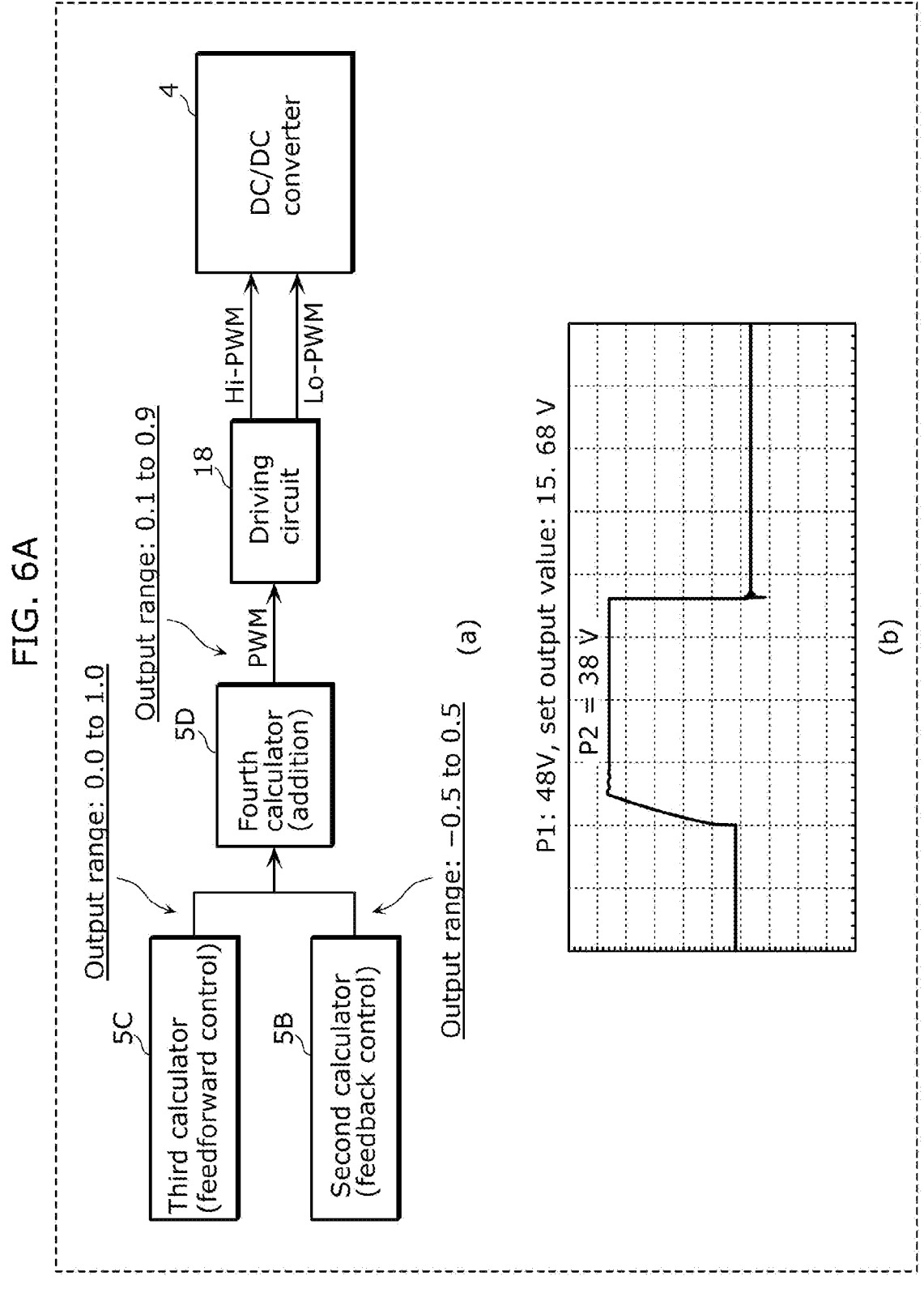
FIG. 6A includes a block diagram illustrating an example of an output range of each calculation in a control circuit of the power conversion device according to the embodiment, and a diagram illustrating an example of a waveform of the output voltage of the power conversion device.

FIG. 6A includes a block diagram ((a) in FIG. 6A) illustrating an example of an output range of each calculation in control circuit 5 of power conversion device 1 according to the embodiment, and a diagram ((b) in FIG. 6A) illustrating an example of a waveform of the output voltage of power conversion device 1.

In the block diagram illustrated in (a) in FIG. 6A, an example of the output ranges of second calculator 5B, third calculator 5C, and fourth calculator 5D in FIG. 3 are shown.

Second calculator 5B calculates a temporary duty ratio by performing a predetermined calculation using target current I0 output from first calculator 5A and first current I1 flowing through conversion circuit 7. When the calculated temporary duty ratio is less than a predetermined minimum value of −0.5, second calculator 5B outputs −0.5 as the first duty ratio. When the calculated temporary duty ratio is greater than or equal to −0.5 and less than or equal to 0.5, the temporary duty ratio is output as the first duty ratio as it is. When the temporary duty ratio is greater than a predetermined maximum value of 0.5, 0.5 is output as the first duty ratio. In other words, second calculator 5B outputs the first duty ratio clamped within the output range of from −0.5 to 0.5. Note that the predetermined calculation is a function that is for approximating (i) a difference between first current I1 and target current I0 and (ii) an integral of the difference in a latest predetermined period to zero, and that can output a value in a range which can be expressed as a real number by a processor of control circuit 5 (for example, a floating-point number expressed with an exponent ranging from 127 to −126 and a significand ranging from 1023 to −1022).

Similarly, third calculator 5C divides the predetermined voltage (target output voltage V0 in the present embodiment) by second voltage V2, and outputs a second duty ratio clamped within the output range of from 0.0 to 1.0.

Moreover, fourth calculator 5D adds the first duty ratio output by second calculator 5B and the second duty ratio output by third calculator 5C, and outputs a driving duty ratio claimed within the output range of from 0.1 to 0.9.

In (b) in FIG. 6A, an example of the waveform of the output voltage of power conversion device 1 when each calculator outputs a value within the output range shown in (a) in FIG. 6A. The horizontal axis represents time, and the vertical axis represents output voltage. The waveform of the output voltage when the input voltage (i.e., second voltage V2) is 48 V ("P1: 48V" in the figure) in the pulse is shown. Target output voltage V0 is 15.68 V ("set output value: 15.68 V"). As shown in the figure, the output voltage has risen to 38 V ("P2=38 V" in the figure) in the pulse.

Figure 6B:
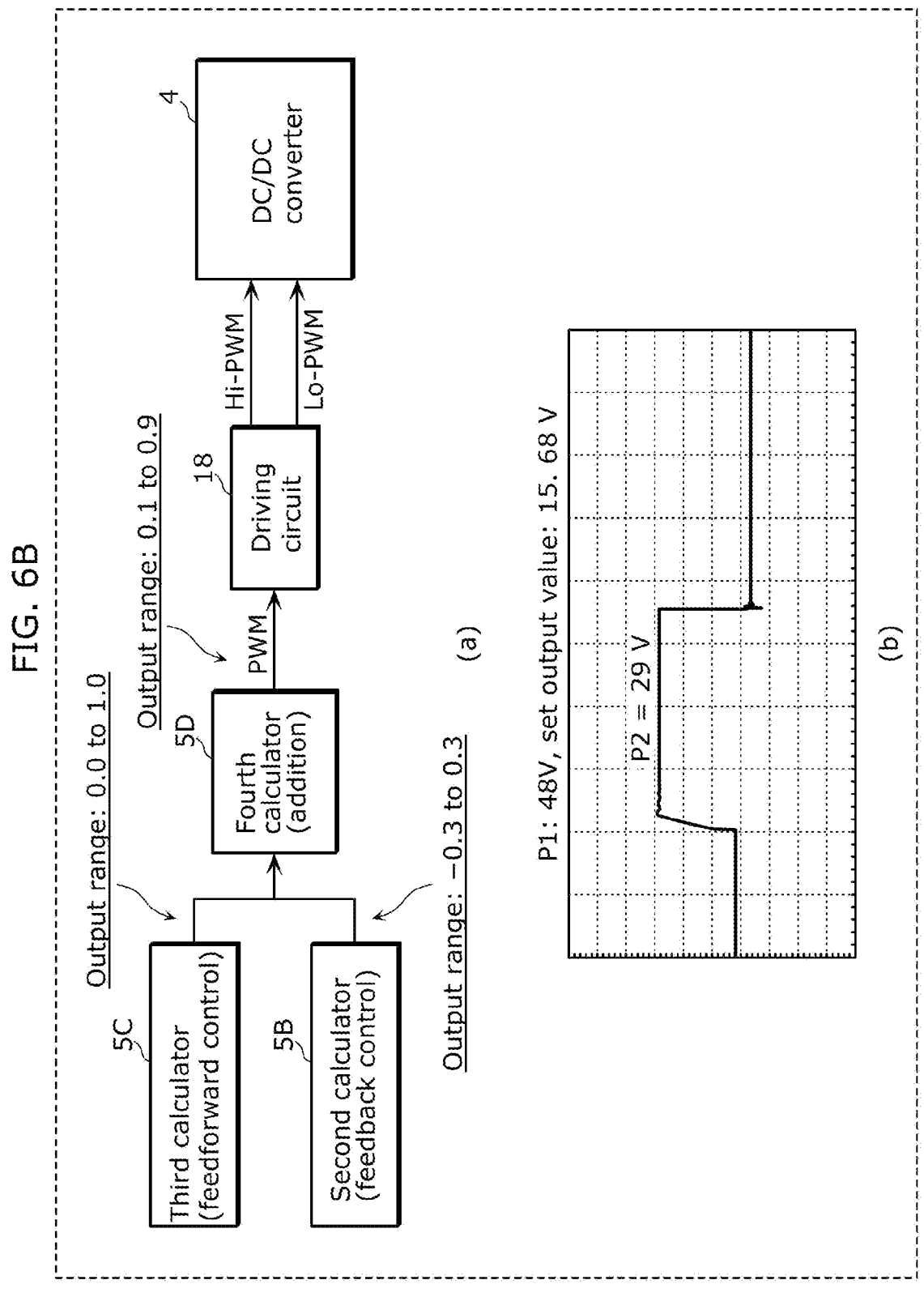
FIG. 6B includes a block diagram illustrating another example of an output range of each calculation in a control circuit of the power conversion device according to the embodiment, and a diagram illustrating an example of a waveform of the output voltage of the power conversion device.

FIG. 6B includes a block diagram ((a) in FIG. 6B) illustrating another example of an output range of each calculation in control circuit 5 of power conversion device 1 according to the embodiment, and a diagram ((b) in FIG. 6B) illustrating an example of a waveform of the output voltage of power conversion device 1.

As illustrated in (a) in FIG. 6B, in this example, the output range of second calculator 5B is from −0.3 to 0.3, which is narrowed from the range shown in FIG. 6A.

As illustrated (b) in FIG. 6B, the rise of the output voltage is suppressed up to 29 V ("P2=29 V" in the figure) in the pulse under the same conditions as in FIG. 6A.

As can be seen by comparing FIG. 6A and FIG. 6B, when target output voltage V0 is set to 15.68 V and there is an anomaly (a resistor for detecting first voltage V1 drifts) under a condition that second voltage V2 is a constant voltage of 48 V, as illustrated in FIG. 6A, the maximum output voltage of power conversion device 1 is 38 V when the output range of second calculator 5B is clamped within a range of from −0.5 to 0.5. In contrast, as illustrated in FIG. 6B, when the output voltage of second calculator 5B is clamped within a range of from −0.3 to 0.3, the maximum output voltage of power conversion device 1 is suppressed to 29 V.

Figure 7:
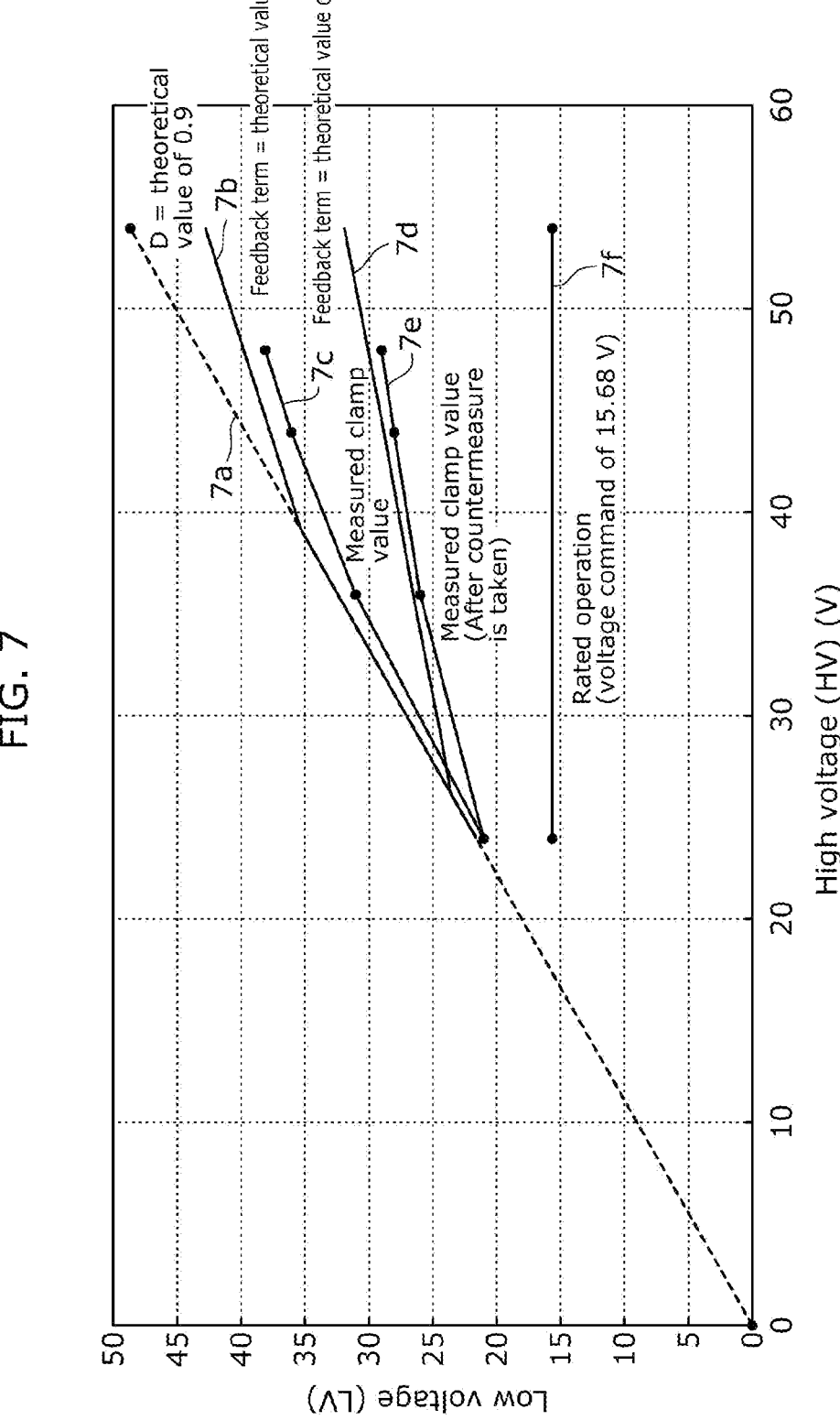
FIG. 7 illustrates theoretical values and measured values of an input voltage and a maximum output voltage in an example of operations in FIG. 6A (output range of a second calculator is −0.5 to 0.5) and an example of operations in FIG. 6B (output range of the second calculator is from −0.3 to 0.3).

FIG. 7 illustrates theoretical values and measured values of the input voltage and the maximum output voltage in an example of operations in FIG. 6A (output range of second calculator 5B is from −0.5 to 0.5) and an example of operations in FIG. 6B (output range of second calculator 5B is from −0.3 to 0.3). The horizontal axis represents input voltage (i.e., second voltage V2), and the vertical axis represents maximum output voltage. Note that target output voltage V0 is 15.68 V.

In FIG. 7, dashed line 7a that linearly extends represents the maximum output voltage when fourth calculator 5D outputs 0.9 as a driving duty ratio. Since the output voltage satisfies the following equation, the output voltage=a driving duty ratio×an input voltage, dashed line 7a represents the maximum output voltage=0.9×an input voltage.

Curved line 7b represents theoretical values of the maximum output voltage when second calculator 5B outputs the maximum value of 0.5. Curved line 7c represents measured values of the maximum output voltage when second calculator 5B outputs the maximum value of 0.5.

Curved line 7d represents theoretical values of the maximum output voltage when second calculator 5B outputs the maximum value of 0.3. Curved line 7e represents measured values of the maximum output voltage when second calculator 5B outputs the maximum value of 0.3.

Line 7f represents theoretical values of the maximum output voltage in rated operation (i.e., in a state where the input voltage is stable and the output voltage is at target output voltage V0 [15.68 V]).

As can be seen from FIG. 7, in both cases where the maximum value of the output of second calculator 5B is 0.5 and where the maximum value of the output of second calculator 5B is 0.3, the measured values of the maximum output voltage match well the theoretical values of the maximum output voltage. A reason why the measured values of the maximum output voltage are slightly smaller than the theoretical values may be mainly due to an effect of dead time occurring in the control and the calculations by control circuit 5.

As can be seen by comparing the cases where the maximum value of the output of second calculator 5B is 0.5 (curved lines 7b and 7c) and where the maximum value of the output of second calculator 5B is 0.3 (curved lines 7d and 7e), when the maximum value of the input voltage is 54 V among the plotted values, the maximum output voltage is approximately 43 V when the maximum value of the output of second calculator 5B is 0.5 (curved lines 7b and 7c). In contrast, when the maximum value of the output of second calculator 5B is 0.3 (curved lines 7d and 7e), the maximum output voltage is suppressed to approximately 32 V. In the latter case, compared with the case where the maximum value of the output of second calculator 5B is 0.5 with respect to 15.68 V, which is a normally used voltage, first voltage V1 does not rise to a level that becomes problematic even when there is an anomaly.

As described above, power conversion device 1 according to the present embodiment includes: input terminal 2; output terminal 3;

DC/DC converter 4 that is connected to input terminal 2 and output terminal 3 and includes switching element 6 and so on and conversion circuit 7 that convers direct-current power; and control circuit 5 that detects a first voltage at output terminal 3, a first current flowing through conversion circuit 7, and a second voltage at input terminal 2, obtains information indicating a target output voltage and a predetermined voltage, and performs a plurality of calculations to emit a pulse width modulation (PWM) signal for driving switching element 6 and so on. Control circuit 5: performs a first calculation for calculating a target current for approximating the first voltage to the target output voltage; performs a second calculation for calculating a first duty ratio for approximating the first current to the target current; performs a third calculation for calculating a second duty ratio based on the predetermined voltage and the second voltage; performs a fourth calculation for calculating a driving duty ratio of the PWM signal using the first duty ratio and the second duty ratio; and controls the first voltage by emitting the PWM signal having the driving duty ratio.

With this, not only the feedback control is repeated as in the conventional technique, but also feedforward control is performed by the third calculation to approximate the value of the output voltage to the target output voltage in addition to the feedback control by the first calculation and the second calculation. Therefore, the output voltage can be stabilized even when the input voltage changes greatly.

Here, control circuit 5 may calculate, in the fourth calculation, the driving duty ratio using a sum of the first duty ratio and the second duty ratio, or the driving duty ratio using a product of the first duty ratio and the second duty ratio. With this, the output voltage can be stabilized by using both the feedback control by the first calculation and the second calculation and the feedforward control by the third calculation.

Moreover, DC/DC converter 4 may include first to Nth conversion circuits connected in parallel (in FIG. 5, the case where there are first to fourth conversion circuits (7A to 7D)

is illustrated as an example), the first to Nth conversion circuits each being the conversion circuit, N being an integer. Control circuit 5 may: calculate the driving duty ratio for each of conversion circuits 7A to 7D; and control the first voltage by emitting, to a corresponding one of conversion circuits 7A to 7D, the PWM signal having the driving duty ratio calculated. This achieves a power conversion device that can supply a large current while maintaining stable output control.

Moreover, control circuit 5 may perform the first calculation, the second calculation, the third calculation, and the fourth calculation upon receipt of a start signal from outside power conversion device 1, and control the first voltage by emitting the PWM signal having the driving duty ratio. This achieves a power conversion device that starts operation in response to a start signal from outside such as an ignition switch of a vehicle.

Moreover, the predetermined voltage may be the target output voltage. With this, the same parameters are used for the feedback control by the first calculation and the second calculation and the feedforward control by the third calculation, and thus the control can be simplified.

Moreover, control circuit 5 may calculate, in the second calculation, a temporary duty ratio by performing a predetermined calculation using the first current and the target current, and when the temporary duty ratio calculated exceeds a predetermined maximum value, control circuit 5 may output the predetermined maximum value as the first duty ratio. With this, the maximum output voltage can be maintained within a predetermined value even when the input voltage greatly changes.

Moreover, a control method for power conversion device 1 according to the present embodiment includes: performing, by control circuit 5, a first calculation (processing by first calculator 5A) for calculating a target current for approximating the first voltage to the target output voltage; performing, by control circuit 5, a second calculation (processing by second calculator 5B) for calculating a first duty ratio for approximating the first current to the target current; performing, by control circuit 5, a third calculation (processing by third calculator 5C) for calculating a second duty ratio based on the predetermined voltage and the second voltage; performing, by control circuit 5, a fourth calculation (processing by fourth calculator 5D) for calculating a driving duty ratio of the PWM signal using the first duty ratio and the second duty ratio; and controlling, by control circuit 5, the first voltage by emitting the PWM signal having the driving duty ratio (processing by driving circuit 18).

With this, not only the feedback control is repeated as in the conventional technique, but also feedforward control is performed by the third calculation to approximate the value of the output voltage to the target output voltage in addition to the feedback control by the first calculation and the second calculation. Therefore, the output voltage can be stabilized even when the input voltage changes greatly.

The power conversion device and the control method for the power conversion device according to the present disclosure have been described above based on the embodiment and its variations, but the present disclosure should not be limited to the embodiment and variations described above. Various modifications of the present embodiment and the variations as well as different forms resulting from one or more combinations of part of structural elements of the embodiment and variations that may be conceived by those skilled in the art may be included within the scope of the present disclosure as long as these do not depart from the teachings of the present disclosure.

For example, in the power conversion device illustrated in FIG. 6A, FIG. 6B, and FIG. 7, it is based on the premise that third calculator 5C uses a target output voltage as the predetermined voltage and fourth calculator 5D calculates the driving duty ratio using a sum of the first duty ratio and the second duty ratio, but this premise is not limiting. Third calculator 5C may use, as the predetermined voltage, output constant voltage VX that is independent of the target output voltage, or fourth calculator 5D may calculate the driving duty ratio using a product of the first duty ratio and the second duty ratio. In any of the premises, by clamping the output range of second calculator 5B to a narrower range, the maximum output voltage when the input voltage changes can be suppressed.

Moreover, vehicle controller 12 and control circuit 5 are described as different structural elements for convenience, but vehicle controller 12 and control circuit 5 may be the same structural element and provided in body 9.

In the present embodiment, description is given using the step-down operation performed in power conversion device 1, but power conversion device 1 according to the present disclosure is not limited to the step-down operation. Stated differently, in power conversion device 1, the voltage level relationship between first battery 10 and second battery 11 may be interchanged and conversion circuit 7 may be configured to perform step-up operation.

Moreover, in the above-described embodiment, control circuit 5 obtains information indicating target output voltage V0 and a predetermined voltage from the memory included in control circuit 5, but control circuit 5 may obtain the information from outside.

Moreover, an object of the present disclosure may also be to provide a program for executing the control method for the power conversion device, and a non-transitory computer-readable recording medium having the program recorded thereon, such as a digital versatile disc (DVD).

INDUSTRIAL APPLICABILITY

The power conversion device according to the present disclosure has an effect of maintaining the output voltage at a stable value and is effective as a DC/DC converter included in various electric devices.

REFERENCE SIGNS LIS 1 power conversion device
2 input terminal
3 output terminal
4 DC/DC converter
5 control circuit
5A first calculator
5B second calculator
5C third calculator
5D fourth calculator
6 switching element
6A switching element
7 conversion circuit
7A, 7B, 7C, 7D conversion circuit
8 vehicle
9 body
10 first battery
11 second battery
12 vehicle controller
13 reactor

13

The invention claimed is:

1. A power conversion device comprising:

an input terminal;

an output terminal;

a DC/DC converter that is connected to the input terminal and the output terminal and includes a conversion circuit that convers direct-current power, wherein the conversion circuit includes a switching element; and a control circuit that detects a first voltage at the output terminal, a first current flowing through the conversion circuit, and a second voltage at the input terminal, obtains information indicating a target output voltage and a predetermined voltage, and performs a plurality of calculations to emit a pulse width modulation (PWM) signal for driving the switching element, wherein the control circuit:

performs a first calculation for calculating a target current for approximating the first voltage to the target output voltage;

performs a second calculation for calculating a first duty ratio for approximating the first current to the target current;

performs a third calculation for calculating a second duty ratio based on the predetermined voltage and the second voltage;

performs a fourth calculation for calculating a driving duty ratio of the PWM signal using the first duty ratio and the second duty ratio;

controls the first voltage by emitting the PWM signal having the driving duty ratio; and calculates the driving duty ratio using a product of the first duty ratio and the second duty ratio in the fourth calculation.

2. The power conversion device according to claim 1, wherein the control circuit calculates the driving duty ratio using a sum of the first duty ratio and the second duty ratio in the fourth calculation.

3. The power conversion device according to claim 1, wherein the DC/DC converter includes first to Nth conversion circuits connected in parallel, the first to Nth conversion circuits each being the conversion circuit, N being an integer, and the control circuit:

calculates the driving duty ratio for each of the first to Nth conversion circuits; and controls the first voltage by emitting, to a corresponding one of the first to Nth conversion circuits, the PWM signal having the driving duty ratio calculated.

4. The power conversion device according to claim 1, wherein the control circuit performs the first calculation, the second calculation, the third calculation, and the fourth calculation upon receipt of a start signal from outside the power conversion device, and controls the first voltage by emitting the PWM signal having the driving duty ratio.

5. The power conversion device according to claim 1, wherein the predetermined voltage is the target output voltage.

6. A power conversion device comprising:

an input terminal;

an output terminal;

a DC/DC converter that is connected to the input terminal and the output terminal and includes a conversion circuit that convers direct-current power, wherein the conversion circuit includes a switching element; and a control circuit that detects a first voltage at the output terminal, a first current flowing through the conversion circuit, and a second voltage at the input terminal, obtains information indicating a target output voltage and a predetermined voltage, and performs a plurality of calculations to emit a pulse width modulation (PWM) signal for driving the switching element, wherein the control circuit:

performs a first calculation for calculating a target current for approximating the first voltage to the target output voltage;

performs a second calculation for calculating a first duty ratio for approximating the first current to the target current;

performs a third calculation for calculating a second duty ratio based on the predetermined voltage and the second voltage;

performs a fourth calculation for calculating a driving duty ratio of the PWM signal using the first duty ratio and the second duty ratio;

controls the first voltage by emitting the PWM signal having the driving duty ratio; and calculates, in the second calculation, a temporary duty ratio by performing a predetermined calculation using the first current and the target current, and when the temporary duty ratio calculated exceeds a predetermined maximum value, the control circuit outputs the predetermined maximum value as the first duty ratio.

7. The power conversion device according to claim 6, wherein the control circuit calculates the driving duty ratio using a sum of the first duty ratio and the second duty ratio in the fourth calculation.

8. A control method for a power conversion device, wherein the power conversion device includes:

an input terminal;

an output terminal;

a DC/DC converter that is connected to the input terminal and the output terminal and includes a conversion circuit that converts direct-current power, wherein the conversion circuit includes a switching element; and a control circuit that detects a first voltage at the output terminal, a first current flowing through the conversion circuit, and a second voltage at the input terminal, obtains information indicating a target output voltage and a predetermined voltage, and performs a plurality of calculations to emit a pulse width modulation (PWM) signal for driving the switching element, the control method comprising:

performing, by the control circuit, a first calculation for calculating a target current for approximating the first voltage to the target output voltage;

performing, by the control circuit, a second calculation for calculating a first duty ratio for approximating the first current to the target current;

performing, by the control circuit, a third calculation for calculating a second duty ratio based on the predetermined voltage and the second voltage;

performing, by the control circuit, a fourth calculation for calculating a driving duty ratio of the PWM signal using the first duty ratio and the second duty ratio;

controlling, by the control circuit, the first voltage by emitting the PWM signal having the driving duty ratio; and calculating, by the control circuit, the driving duty ratio using a product of the first duty ratio and the second duty ratio in the fourth calculation.

9. The power conversion device according to claim 6, wherein the DC/DC converter includes first to Nth conversion circuits connected in parallel, the first to Nth conversion circuits each being the conversion circuit, N being an integer, and the control circuit:

calculates the driving duty ratio for each of the first to Nth conversion circuits; and controls the first voltage by emitting, to a corresponding one of the first to Nth conversion circuits, the PWM signal having the driving duty ratio calculated.

10. The power conversion device according to claim 6, wherein the control circuit performs the first calculation, the second calculation, the third calculation, and the fourth calculation upon receipt of a start signal from outside the power conversion device, and controls the first voltage by emitting the PWM signal having the driving duty ratio.

11. The power conversion device according to claim 6, wherein the predetermined voltage is the target output voltage.

* * * * *